United States Patent Office 3,082,799
Patented Mar. 26, 1963

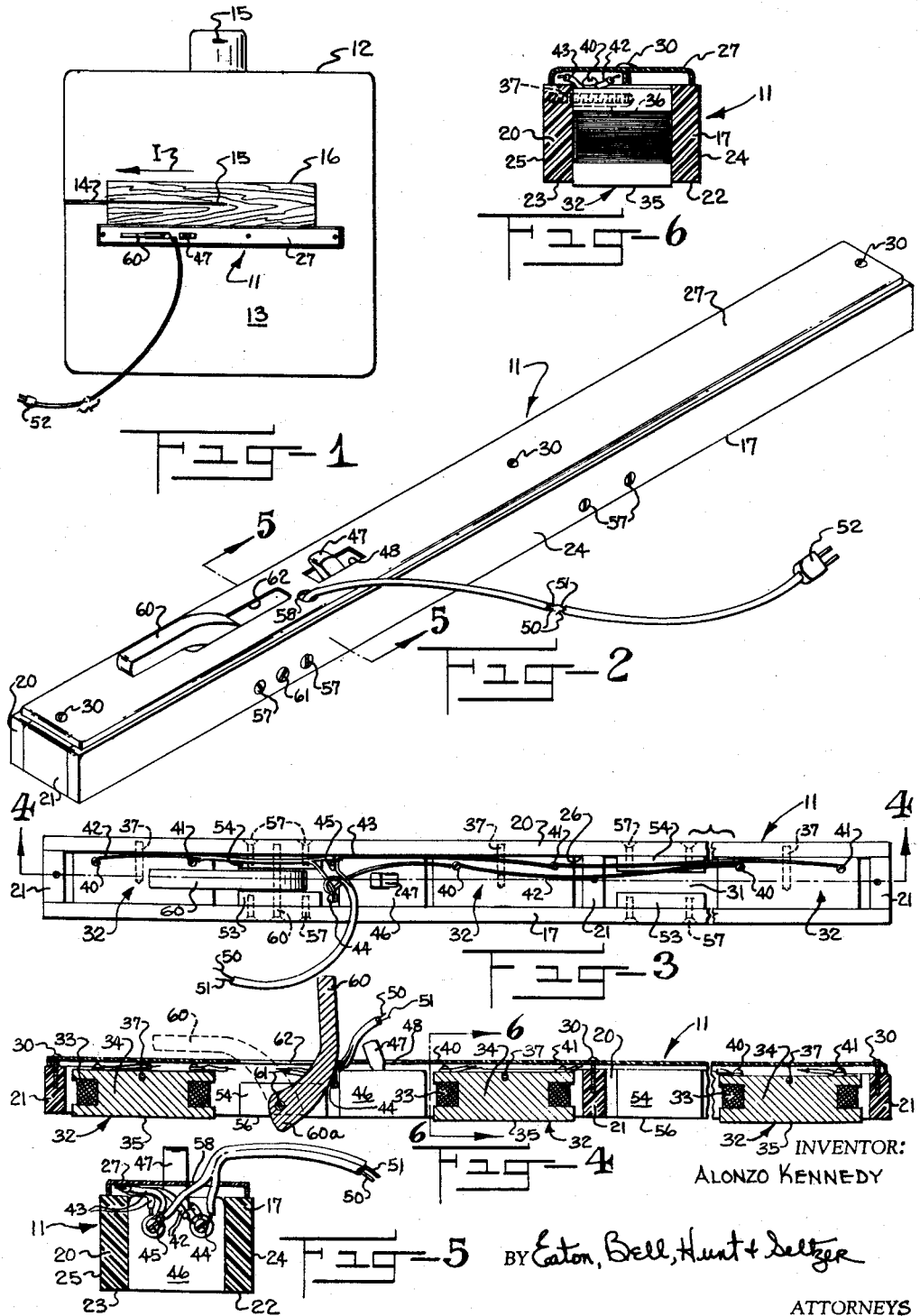

3,082,799
MAGNETIC WORK GUIDE
Alonzo Kennedy, Rte. 1, Box 78, Lexington, N.C.
Filed Sept. 2, 1959, Ser. No. 837,669
5 Claims. (Cl. 143—168)

This invention relates to a work guide for a machine tool and more particularly a magnetic work guide for use with the work supporting surface of a machine such as a bandsaw or the like to guide the movement of the work through the saw blade.

As is well known, work guides of many types are commonly provided on many machines to permit the accurate processing of the work fed to the machine. In machines for sawing material such as wood or the like of which a bandsaw is representative, it is highly desirable that the wood to be cut is guided in a straight line so as to permit a straight cut to be made therethrough by the saw blade. Generally, such machines for sawing wood are provided with a flat work supporting surface or plate across which the work is moved manually or otherwise as it is cut by the saw blade with the work guidably contacting a guiding surface on the work guide. This work guide is generally an elongated member one side of which forms a work guiding surface and is fastened to the work supporting surface by means such as clamps, bolts, and similar devices. As the saw blade is positioned in a fixed position relative to the work supporting surface, the work guide must therefore be moved to a selected position in accordance with the particular cut to be made in the work. This means that when such guide retaining devices as clamps, bolts and the like are employed, considerable time and skill is required in positioning the work guide in the various positions selected. Furthermore, when clamps and the like are employed, it is often quite difficult to locate the work guide precisely where desired as the tightening of the clamps may move the work guide slightly from the position selected. In addition, it is often difficult, if not impossible, to provide an arrangement whereby such a work guide may be positioned in a sufficiently wide range of positions due to the physical limitations of the work supporting surface and associated parts of the machine.

Accordingly, a primary object of this invention is to provide a new and novel magnetic work guide for machine tools such as a bandsaw or the like.

Another object of this invention is to provide a new and novel magnetic work guide for a machine such as a bandsaw or the like which may be located in any desired work guiding position on the work supporting surface of the machine in a simple and easy manner.

A further object of the invention is to provide a new and novel magnetic work guide for a machine tool such as a bandsaw which takes advantage of the positive gripping action of electromagnets but at the same time is provided with auxiliary magnetic means which retain the work guide in the adjusted position in the event of failure of power to the electromagnets.

Still another object of the invention is to provide a new and novel magnetic work guide which is simple and inexpensive in construction, which may be utilized as a work guide on a wide variety of machine tools having work supporting surfaces composed of magnetic material, and which may be readily positioned and positively retained in a selected work guiding position during use while permitting ready removal when desired.

The objects of the invention and other related objects are accomplished by providing a work guide having an elongate body which contains a straight, longitudinally extending work guiding surface along at least one side. Magnetic means are carried by the body which consists of at least one electromagnet and preferably at least one permanent magnet. Means are provided for connecting the electromagnet to an associated source of power so that when the work guide is positioned on a work supporting surface composed of magnetic material both the electromagnet when energized and the permanent magnet magnetically grip the work supporting surface of the particular machine tool with which the guide is associated and retain the work guide in a selected position. When the work guide is to be removed or its position changed, the electromagnet is deenergized and the work guide is tilted slightly by means of a lever or the like carried by the work guide so that the permanent magnet is moved into spaced apart relationship with the work supporting surface. When the permanent magnet is thus released, the work guide may be readily moved to any selected work guiding position.

Some of the objects of the invention having been stated, other objects will appear as the description proceeds when taken in connection with the accompanying drawings, in which—

FIGURE 1 is a plan view of a portion of a bandsaw illustrating the magnetic work guide of the invention in a work guiding position;

FIGURE 2 is an isometric view of the magnetic work guide of the invention;

FIGURE 3 is a plan view of the magnetic work guide of FIGURE 2 with the cover removed;

FIGURE 4 is a sectional view taken substantially along line 4—4 of FIGURE 3;

FIGURE 5 is a sectional view taken substantially along line 5—5 of FIGURE 2 in the direction of the arrows; and FIGURE 6 is a sectional view taken substantially along line 6—6 of FIGURE 4 in the direction of the arrows.

Referring now to the drawings, FIGURE 2 shows a work guide constructed in accordance with the invention and designated generally by the numeral 11. FIGURE 1 shows a portion of a machine with which the magnetic work guide 11 may be incorporated although any suitable machine such as routers, shapers, saws or the like may incorporate such a work guide. In the specific embodiment illustrated, the machine is a bandsaw and contains a flat plate or bed 12 having a work supporting surface 13 formed from a magnetic material such as cast iron, steel or the like. As is well known, the plate 12 is positioned within a substantially horizontal plane and such a bandsaw has its plate 12 provided with a slot 14 which permits the insertion of a vertically movable saw blade 15 driven by any suitable means (not shown).

The work guide 11 of the invention which will be described in detail hereinafter is positioned on the surface 13 of the plate 12 in a selected position so that the work such as a piece of wood 16 may be moved into cutting engagement with the saw blade 15 along a straight line as indicated by the arrow I being guide by the work guide 11.

Referring now again to FIGURE 2, the work guide 11 comprises an elongate body inverted U-shaped in cross section, which in the specific embodiment is formed from a pair of side members or plates 17, 20 arranged in substantially parallel, spaced apart relationship by means such as spacers 21 suitably secured thereto, and preferably formed of non-magnetic material. The side plates 17, 20 are preferably formed from a non-magnetic material such as laminated plastic or aluminum. However, laminated plastic is preferred due to its additional characteristic of being electrically non-conductive. The side plates are shown as having straight lower edges 22, 23 and flat side wall faces 24, 25 respectively with either of the side walls forming a guide surface for the work.

The side plates 17, 20 define a cavity 26 the upper end of which is closed by a removable cover 27, also preferably formed of non-magnetic material and being suitably secured to the spacers 21 by means such as screws 30. The lower end of the cavity 26 is therefore open to provide the work guide with a bottom opening 31.

In order to retain the work guide 11 in a selected position, magnetic means are carried by the work guide which magnetically grip the surface 13 of the work plate 12, when the guide is positioned as desired. More specifically, at least one electromagnet is supported in the body cavity 26 so as to provide for magnetically retaining the work guide 11 in the desired position. In the specific embodiment illustrated, three of such electromagnets, designated generally by the numeral 32, are positioned in spaced relationship within the cavity 26. These electromagnets 32 are of conventional construction and are provided with a coil 33 and a core 34 having a lower surface 35 arranged to contact the plate surface 13.

In order to support the electromagnets 32 in the position shown, each of the electromagnets 32 is provided with a recess 36 extending transversely within its core 34 as shown in FIGURE 6. Each recess 36 is arranged to receive a set screw 37 threadedly inserted through the wall of the side plate 20 as shown. The set screw 37 may be formed of a non-magnetic material such as plastic, if desired. The diameter of the recesses 36 is somewhat greater than the diameter of the set screw 37 so that in its lowermost position under certain conditions one or more of the electromagnets 32 project outwardly through the cavity opening 31 to a limited extent past the lower edges 22, 23 of the side plates 17, 20 respectively to engage the work supporting surface. Such a condition of the electromagnets would occur when for example the work supporting surface is irregular or uneven to cause portions of the lower edges 22, 23 of the side plates to lie in spaced relation thereto. However, in normal use on a flat planar work supporting surface the faces 35 of the electromagnets will be flush with the lower edges 22, 23 of the side plates 17, 20 respectively.

As a result of this limited vertical movement of the electromagnets 32, any vertical bowing or distortion in the body of the work guide 11 caused by warping or the like will be compensated for as contact between the bottom surfaces 35 of the electromagnets 32 and the plate surface 13 can always be obtained when the work guide is positioned in a work guiding position.

Means are provided for energizing the electromagnets 32 and as shown each of the electromagnets is provided with a pair of terminals 40, 41 to which are connected lead wires 42, 43 respectively so as to interconnect all of the electromagnets in the work guide in electrical parallel relationship as shown best in FIGURE 3. The lead wires 42, 43 are connected in turn to terminals 44, 45 on a manually operated switch 46 suitably mounted within the guide body cavity 26 as shown.

The switch 46 is provided with an operating lever 47 projecting upwardly through an opening 48 in the cover 27 for access thereto, for controlling the energization of the electromagnets 32. A pair of power conductors 50, 51 terminating in a connector plug 52 are connected to the switch terminals 44, 45 in order to connect the electromagnets 32 to an associated source of power (not shown). The conductors 50, 51 are shown extending through an opening 58 in the guide cover 27.

In order to further aid in magnetically retaining the work guide 11 in the selected work guiding position, permanent magnets are also positioned within the body cavity 26 as shown best in FIGURE 3. Preferably, these magnets are arranged in spaced pairs identified by the numerals 53, 54 and have lower surface portions 56. The permanent magnets 53, 54 are supported in any suitable manner such as by screws 57 on the side plates 17, 20 respectively of the guide 11. The magnets 53, 54 are positioned with their lower surfaces 56 substantially flush with the lower edges 22, 23 of the side plates 17, 20 respectively.

In order to prevent any magnetic attraction between the magnets on the guide and the plate surface 13, a lever 60 having an enlarged end 60a is pivotally mounted by means such as a pin 61 within the cavity 26 between one pair of the permanent magnets 53, 54 as shown in FIGURES 3 and 4. This lever 60 extends upwardly through an opening 62 in the guide cover 27 for ready manipulation by the operator.

In the operation of the work guide 11, the lever 60 on the work guide is moved to the extended solid line position of FIGURE 4 and the guide 11 is moved into a selected work guiding position such as shown in FIGURE 1. The connector plug 52 is preferably connected to an associated source of power at this time but the switch 46 has been opened by movement of the lever 47 to the "off" position so that the electromagnets are deenergized.

When the proper position of the work guide 11 has been established, the lever 60 is then moved into the retracted dotted line position of FIGURE 4 so that the lower surfaces 56 of the permanent magnets 53, 54 respectively, magnetically grip the plate surface 13.

At this time the electromagnets 32 may be energized by moving the operating lever 47 of the switch 46 to the "on" position and the magnetic forces produced by the electromagnets magnetically grip the work supporting surface 13 for positively retaining the guide 11 in the work guiding position. It should be understood that the electromagnets 32 may be used alone without the permanent magnets 53, 54 but the permanent magnets have been incorporated in the work guide 11 so that the guide 11 will be retained in position in the event of a power failure.

To remove the work guide 11 from its operating position of FIGURE 1, the electromagnets 32 are deenergized by moving the switch operating lever 47 to the "off" position and the lever 60 to the extended solid line position of FIGURE 4 to break the contact between the permanent magnets and the work supporting surface 13. Also the lever 60 serves to interrupt the residual magnetic attraction of the electromagnets.

It can be seen that there has been provided a new and novel work guide which may be used on a wide variety of types of machines such as saws, shapers, routers and the like to guide the material being processed.

In the drawings and specification there has been set forth a preferred embodiment of the invention and, although specific terms are employed, they are used in a generic and descriptive sense only and not for purposes of limitation, the scope of the invention being defined in the claims.

I claim:
1. A magnetic work guide for use with a work supporting surface formed from magnetic material comprising an elongate body having a cavity therein and a work guiding surface extending longitudinally along one side thereof, at least one electromagnet carried by said body within said cavity and having its lower end disposed to magnetically engage the work supporting surface, at least one permanent magnet carried by said body within said cavity in spaced relation to said electromagnet to magnetically engage the work supporting surface, and pivotally mounted lever means carried by said body and being positioned within said cavity and portions thereof movable outwardly beyond said body for moving lower edge portions of the body away from the work supporting surface to interrupt the magnetic attraction of the magnets.

2. A magnetic work guide for use with a work supporting surface formed from magnetic material comprising an elongate body being inverted U-shaped in cross section and having a cavity therein, at least one electromagnet positioned within said cavity and having its lower portion positioned to engage the work supporting surface, means including a manually operated switch carried by said body for connecting said electromagnet to a source of power, at least one permanent magnet positioned in said cavity in spaced relation to said electromagnet, said body having an opening in a medial top portion thereof communicating with said cavity, and a manually operated lever carried by said body and extending through said opening in the top portion thereof, said lever being movable between a retracted position within said cavity and an extended position projecting outwardly from said cavity to interrupt the magnetic attraction of the magnets with the work supporting surface.

3. A magnetic work guide for use with a work supporting surface formed from a magnetic material comprising an elongate body having a cavity therein and a work guiding surface extending longitudinally and uninterruptedly along one side thereof, at least two electromagnets carried by said body within said cavity and being positioned in spaced apart relation adjacent the respective opposite ends of said body, said electromagnets having their lower ends disposed to permit magnetic engagement of the work supporting surface, at least one permanent magnet carried by said body within said cavity intermediate said electromagnets and in spaced relation thereto and being adapted to magnetically engage the work supporting surface, and pivotally mounted lever means carried by said body intermediate said electromagnets and being positioned closer to one end of said body than the other and adapted to be moved outwardly beyond lower edge portions of said body for interrupting the magnetic attraction of the magnets with the work supporting surface.

4. A magnetic work guide for use with a work supporting surface formed from magnetic material comprising an elongate body having a work guiding surface extending longitudinally and uninterruptedly along one side thereof, said body being inverted U-shaped in cross-section and having a cavity therein, at least a pair of spaced apart electromagnets positioned within said cavity and having their lower portions positioned to permit engagement with the work supporting surface, means including a manually operable switch carried by said body for connecting said electromagnets to a source of power, at least one permanent magnet positioned in said cavity intermediate said electromagnets and in spaced relation thereto, said body having an opening in a medial top portion thereof communicating with said cavity, and a manually operable lever carried by said body and extending through said opening in the top portion thereof, said lever being movable between a retracted position within said cavity and an extended portion projecting outwardly from said cavity to interrupt the magnetic attraction of the magnets with the work supporting surface.

5. A magnetic work guide according to claim 4 wherein said manually operable lever is positioned between said electromagnets and closer to one end of said elongate body than the other.

References Cited in the file of this patent

UNITED STATES PATENTS

| | | |
|---|---|---|
| 723,518 | Ellison | Mar. 24, 1903 |
| 1,245,821 | Thompson | Nov. 6, 1917 |
| 1,462,101 | Colson | July 17, 1923 |
| 1,915,631 | Truba | June 27, 1933 |
| 2,367,582 | Honyoust | Jan. 16, 1945 |
| 2,700,993 | Pence | Feb. 1, 1955 |
| 2,771,920 | Ambelang | Nov. 27, 1956 |
| 2,808,084 | Eschenborg et al. | Oct. 1, 1957 |
| 2,869,047 | Smit et al. | Jan. 13, 1959 |
| 2,887,910 | Williamson | May 26, 1959 |
| 2,954,257 | Besuch et al. | Sept. 27, 1960 |

FOREIGN PATENTS

| | | |
|---|---|---|
| 1,183,215 | France | Jan. 26, 1959 |